US012642249B2

(12) United States Patent
Li

(10) Patent No.: US 12,642,249 B2
(45) Date of Patent: Jun. 2, 2026

(54) BARK STOPPING METHOD AND A BARK STOPPING DEVICE

(71) Applicant: Guangdong Cool Technlogy Co., Ltd., Yangjiang (CN)

(72) Inventor: Mingya Li, Shenzhen (CN)

( * ) Notice: Subject to any disclaimer, the term of this patent is extended or adjusted under 35 U.S.C. 154(b) by 31 days.

(21) Appl. No.: 18/946,070

(22) Filed: Nov. 13, 2024

(65) Prior Publication Data

US 2026/0047554 A1 Feb. 19, 2026

(30) Foreign Application Priority Data

Aug. 15, 2024 (CN) .......................... 202411125007.6

(51) Int. Cl.
*A01K 15/02* (2006.01)
*G10L 25/78* (2013.01)

(52) U.S. Cl.
CPC ............ *A01K 15/022* (2013.01); *G10L 25/78* (2013.01)

(58) Field of Classification Search
CPC .............................. G10L 25/78; A01K 15/022
USPC ...................................................... 340/573.3
See application file for complete search history.

(56) References Cited

U.S. PATENT DOCUMENTS 11,039,601 B1 6/2021 Jia
11,528,891 B2 12/2022 Li

2007/0095303 A1* 5/2007 Lee, IV ............... A01K 15/022
119/718
2020/0404886 A1* 12/2020 Gibbs .................. A01K 27/009
2024/0147963 A1 5/2024 Huang et al.
2024/0334906 A1* 10/2024 Arumugham ........ A01K 15/022
2025/0081937 A1* 3/2025 Mundell .............. A01K 15/022

FOREIGN PATENT DOCUMENTS

| CN | 107960342 A | 4/2018 |
| CN | 110915713 A | 3/2020 |
| CN | 211983245 U | * 11/2020 |
| CN | 112825790 B | 2/2023 |

OTHER PUBLICATIONS

Ultrasonic Bark Stopping Device for Dog; Tan, Kai-da (Year: 2020).*

* cited by examiner

*Primary Examiner* — Naomi J Small

(57) ABSTRACT

A bark stopping method and a bark stopping device, which relate to the technical field of pet equipment. A sound collecting module, a distance detecting module and a sound wave emitting module are adopted as components for sound collection, distance detection and driving sound emission; after acquiring a first environmental sound and identifying a dog barking sound, a type of a barking dog is identified, a frequency of a barking sound wave is identified, and then a first driving sound wave with the same frequency is generated; after acquiring a first distance, if the first distance is less than a preset distance, the first driving sound wave is emitted towards the barking dog, and after acquiring a current second environmental sound, if no barking sound exists in the second environmental sound, and the emission of the first driving sound wave is stopped.

10 Claims, 3 Drawing Sheets

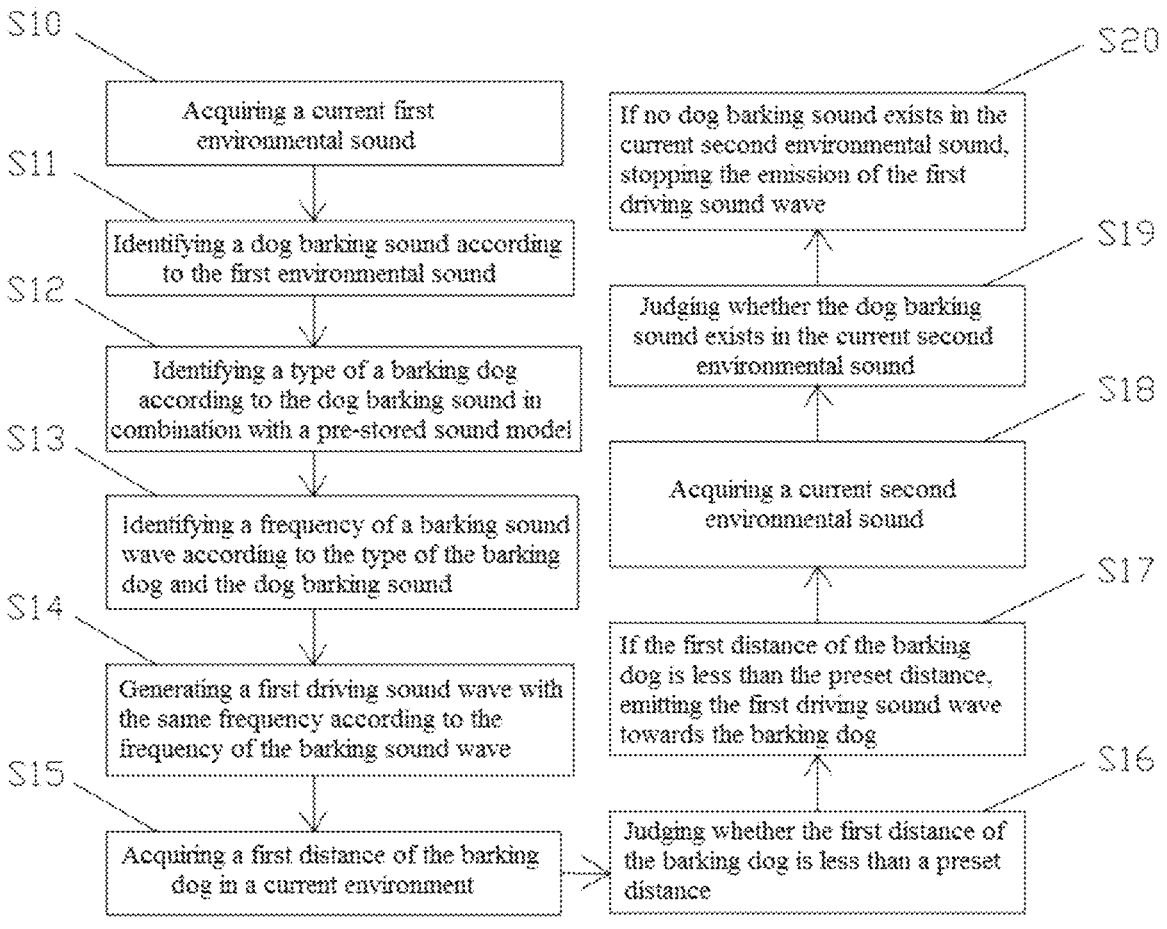

S10
Acquiring a current first environmental sound

S11
Identifying a dog barking sound according to the first environmental sound

S12
Identifying a type of a barking dog according to the dog barking sound in combination with a pre-stored sound model S13
Identifying a frequency of a barking sound wave according to the type of the barking dog and the dog barking sound S14
Generating a first driving sound wave with the same frequency according to the frequency of the barking sound wave S15
Acquiring a first distance of the barking dog in a current environment S16
Judging whether the first distance of the barking dog is less than a preset distance S17
If the first distance of the barking dog is less than the preset distance, emitting the first driving sound wave towards the barking dog S18
Acquiring a current second environmental sound S19
Judging whether the dog barking sound exists in the current second environmental sound S20
If no dog barking sound exists in the current second environmental sound, stopping the emission of the first driving sound wave

FIG. 1

BARK STOPPING METHOD AND A BARK STOPPING DEVICE

FIELD OF THE INVENTION

The present invention relates to the technical field of pet equipment, and particularly to a bark stopping method and a bark stopping device.

BACKGROUND OF THE INVENTION

Pet dogs have always been loyal partners of human beings, accompanying many people's lives, and even guide dogs have entered the field of assisting human life. The present invention mainly aims at the field of pet dogs, and there are many kinds of pet dogs, comprising Maltese dogs, Husky dogs, Poodle dogs, and the like. These pets are good companions when they are quiet, but the pet dogs are also sensitive animals, and sometimes they cannot help their nature. Their bark often interferes with people's normal life and disturbs residents.

The patent number CN112825790B discloses a bark identifying and stopping method and device and a bark stopper, wherein the bark is stopped by releasing aroma to drive the dog after acquiring a dog barking sound, which achieves an obvious effect, but users need to add the aroma regularly, and the bark cannot be stopped if the aroma is insufficient, which is not conducive to long-term use, and too much aroma will diffuse in the surrounding environment, which has a negative impact on the olfactory sensation of the dog and is not conducive to the normal life of the dog.

Therefore, it is necessary to provide a bark stopping method and a barking stopping device to stop the bark of the barking dog, thus facilitating long-term use by a user without having a negative impact on the olfactory sensation of the dog.

SUMMARY OF THE INVENTION

In order to solve the above problem, the present invention provides a bark stopping method and a barking stopping device to stop the bark of the barking dog, thus facilitating long-term use by a user without having a negative impact on the olfactory sensation of the dog.

The technical scheme adopted in the present invention is as follows:

the present invention provides a bark stopping method, comprising:

acquiring a current first environmental sound;

identifying a dog barking sound according to the first environmental sound;

identifying a type of a barking dog according to the dog barking sound in combination with a pre-stored sound model;

identifying a frequency of a barking sound wave according to the type of the barking dog and the dog barking sound;

generating a first driving sound wave with the same frequency according to the frequency of the barking sound wave;

acquiring a first distance of the barking dog in a current environment;

judging whether the first distance of the barking dog is less than a preset distance;

if the first distance of the barking dog is less than the preset distance, emitting the first driving sound wave towards the barking dog;

acquiring a current second environmental sound;

judging whether the dog barking sound exists in the current second environmental sound; and if no dog barking sound exists in the current second environmental sound, stopping the emission of the first driving sound wave.

Further, the step of judging whether the dog barking sound exists in the environment, further comprises:

if the dog barking sound exists in the environment, acquiring a second distance of the barking dog in the current environment;

judging whether the second distance of the barking dog is less than a preset distance;

if the second distance of the barking dog is less than the preset distance, sequentially carrying out numerical value transformation and pause in a preset frequency range on the basis of the frequency of the barking sound wave to obtain a plurality of second driving sound waves with different frequencies;

sequentially emitting the second driving sound waves with different frequencies towards the barking dog at a preset time interval, acquiring a current third environmental sound once when the second driving sound wave is emitted every time until no dog barking sound exists in the third environmental sound, and stopping the emission of the second driving sound wave; and recording a frequency of the last second driving sound wave without the dog barking sound, and packaging and storing the second driving sound wave at the frequency with a corresponding dog type.

Further, the step of sequentially carrying out the numerical value transformation and pause in the preset frequency range on the basis of the frequency of the barking sound wave to obtain the plurality of second driving sound waves with different frequencies, comprises:

acquiring a first sound wave frequency value of a current dog barking sound;

putting the first sound wave frequency value into a sound wave frequency threshold with a range of 15~30 KHz for comparison;

selecting a sound wave frequency waveband greater than the first sound wave frequency value and less than 30 KHz; and taking the first sound wave frequency value as a base quantity a, taking a preset increase frequency value as an increase quantity b, carrying out transformation and pause with $a+b^n$, and assigning a value of $a+b^n$ to the second driving sound wave to obtain a plurality of second driving sound waves which are gradually increased, wherein $n>0$, and a, b and n are all positive integers.

Further, the step of sequentially emitting the second driving sound waves with different frequencies towards the barking dog at the preset time interval, and acquiring the current third environmental sound once when the second driving sound wave is emitted every time until no dog barking sound exists in the third environmental sound, comprises:

emitting the second driving sound wave within a first preset time;

acquiring the second environmental sound after waiting for a second preset time;

judging whether the dog barking sound exists in the third environmental sound;

if the dog barking sound exists in the third environmental sound, emitting the second driving sound waves with different frequencies within the first preset time;

acquiring the third environmental sound after waiting for the second preset time;

judging whether the dog barking sound exists in the third environmental sound; and if the dog barking sound exists in the third environmental sound, repeatedly executing the above steps until no dog barking sound exists in the third environmental sound.

Further, the step of acquiring the first distance of the barking dog in the current environment, comprises:

acquiring a horizontal distance, a vertical height and a transverse width of a front object;

judging whether the horizontal distance is less than a preset distance;

if the horizontal distance is less than the preset distance, carrying out first marking;

judging whether the vertical height is within a preset dog standing height threshold;

if the vertical height is within the preset dog standing height threshold, carrying out second marking;

judging whether the transverse width is within a preset dog standing width threshold;

if the transverse width is within the preset dog standing width threshold, carrying out third marking; and if the front object satisfies the first marking, the second marking and the third marking at the same time, identifying the front object as the barking dog by default, and assigning the horizontal distance as the first distance.

A bark stopping device according to the above bark stopping method, comprises a shell, a circuit board, a sound collecting module, a distance detecting module and a sound wave emitting module, wherein the circuit board is fixedly connected in the shell, the sound collecting module, the distance detecting module and the sound wave emitting module are all fixedly connected to one side of the shell, the sound collecting module, the distance detecting module and the sound wave emitting module are all oriented to the outside, the sound collecting module, the distance detecting module and the sound wave emitting module are all electrically connected with the circuit board, and the circuit board is provided with a first comparing and identifying module, a second comparing and identifying module, a third comparing and identifying module, an computing module, a first judging module, a first executing module, a second judging module and a second executing module;

the sound collecting module is configured for acquiring the current first environmental sound, second environmental sound and third environmental sound;

the distance detecting module is configured for acquiring the first distance and the second distance of the barking dog in the current environment;

the sound wave emitting module is configured for emitting the first driving sound wave and the second driving sound wave towards the barking dog;

the first comparing and identifying module is configured for identifying the dog barking sound according to the first environmental sound;

the second comparing and identifying module is configured for identifying the type of the barking dog according to the dog barking sound in combination with the pre-stored sound model;

the third comparing and identifying module is configured for identifying the frequency of the barking sound wave according to the type of the barking dog and the dog barking sound;

the computing module is configured for generating the first driving sound wave with the same frequency according to the frequency of the barking sound wave;

the first judging module is configured for judging whether the first distance of the barking dog is less than the preset distance;

the first executing module is configured for, if the first distance of the barking dog is less than the preset distance, emitting the first driving sound wave towards the barking dog;

the second judging module is configured for judging whether the dog barking sound exists in the current second environmental sound; and the second executing module is configured for, if no dog barking sound exists in the current second environmental sound, stopping the emission of the first driving sound wave.

Further, the circuit board is further provided with a third executing module, a third judging module, a fourth executing module, an alternative executing module and a record storage module;

the third executing module is configured for, if the dog barking sound exists in the current second environmental sound in judgement, starting up the sound collecting module;

the third judging module is configured for judging whether the second distance of the barking dog is less than the preset distance;

the fourth executing module is configured for, if the second distance of the barking dog is less than the preset distance, sequentially carrying out the numerical value transformation and pause in the preset frequency range on the basis of the frequency of the barking sound wave to obtain the plurality of second driving sound waves with different frequencies;

the alternative executing module is configured for sequentially emitting the second driving sound waves with different frequencies towards the barking dog at the preset time interval, acquiring the current third environmental sound once when the second driving sound wave is emitted every time until no dog barking sound exists in the third environmental sound, and stopping the emission of the second driving sound wave; and the record storage module is configured for recording the frequency of the last second driving sound wave without the dog barking sound, and packaging and storing the second driving sound wave at the frequency with the corresponding dog type.

Further, the bark stopping device further comprises a distance detection and adjustment switch, the distance detection and adjustment switch is fixedly connected to the shell, and the distance detection and adjustment switch is electrically connected with the circuit board.

Further, the bark stopping device further comprises a display screen, the display screen is fixedly connected to one side of the shell, and the display screen is electrically connected with the circuit board.

Further, the bark stopping device further comprises a battery, the battery is fixedly connected inside the shell, and the battery is electrically connected with the circuit board.

The present invention has the beneficial effects as follows:

according to the bark stopping method and the bark stopping device provided by the present invention, a sound collecting module, a distance detecting module and a sound wave emitting module are adopted as components for sound collection, distance detection and driving sound emission, after acquiring a first environmental sound and identifying a dog barking sound, a type of a barking dog is identified, then a frequency of a barking sound wave is identified, and then a first driving sound wave with the same frequency is generated, and after acquiring a first distance, if the first distance is less than a preset distance, the first driving sound wave is emitted towards the barking dog to acquire a current second environmental sound, and if no barking sound exists in the second environmental sound, the emission of the first driving sound wave is stopped, and the bark is successfully stopped at this time; and in conclusion, the barking stopping method and the barking stopping device can stop the bark of the barking dog, thus facilitating long-term use by a user without having a negative impact on the olfactory sensation of the dog.

BRIEF DESCRIPTION OF THE DRAWINGS

FIG. 1 is a flow chart of a bark stopping method of the present invention;

Figure 2:
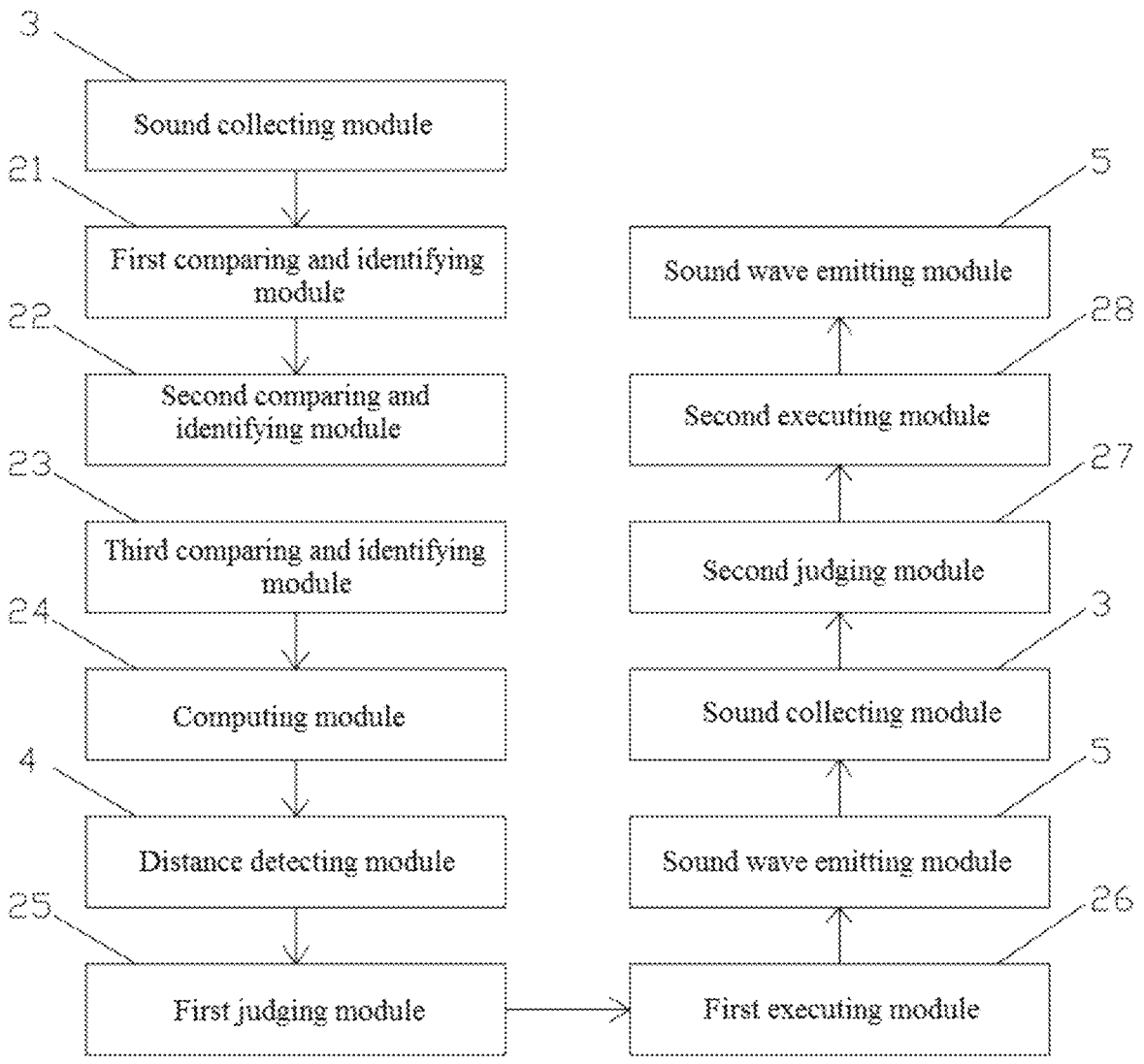
FIG. 2 is a block diagram of modules in a circuit board of a bark stopping device of the present invention.

Reference numerals are as follows:

1 refers to shell, 3 refers to sound collecting module, 4 refers to distance detecting module, 5 refers to sound wave emitting module, 6 refers to distance detection and adjustment switch, 7 refers to display screen, 21 refers to first comparing and identifying module, 22 refers to second comparing and identifying module, 23 refers to third comparing and identifying module, 24 refers to computing module, 25 refers to first judging module, 26 refers to first executing module, 27 refers to second judging module and 28 refers to second executing module.

DETAILED DESCRIPTION OF SOME EMBODIMENTS

In order to describe the technical solution of the present invention more clearly and completely, the present invention is further described hereinafter with reference to the drawings.

With reference to FIG. 1 to FIG. 2, the present invention provides a bark stopping method, which comprises the following steps;

S10: acquiring a current first environmental sound;

S11: identifying a dog barking sound according to the first environmental sound;

S12: identifying a type of a barking dog according to the dog barking sound in combination with a pre-stored sound model;

S13: identifying a frequency of a barking sound wave according to the type of the barking dog and the dog barking sound;

S14: generating a first driving sound wave with the same frequency according to the frequency of the barking sound wave;

S15: acquiring a first distance of the barking dog in a current environment;

S16: judging whether the first distance of the barking dog is less than a preset distance;

S17: if the first distance of the barking dog is less than the preset distance, emitting the first driving sound wave towards the barking dog;

S18: acquiring a current second environmental sound;

S19: judging whether the dog barking sound exists in the current second environmental sound; and S20: if no dog barking sound exists in the current second environmental sound, stopping the emission of the first driving sound wave.

In this embodiment, the current first environmental sound is acquired, and the first environmental sound refers to all surrounding sounds; the dog barking sound is identified according to the first environmental sound, and if a sound in the first environmental sound conforms to the frequency of the dog barking sound, the dog barking sound is separately distinguished and marked as the dog barking sound; the type of the barking dog is identified according to the dog barking sound in combination with the pre-stored sound model, barking sounds of different dogs have different timbres and frequencies, and the pre-stored sound model stores barking sounds of various dogs; the frequency of the barking sound wave is identified according to the type of the barking dog and the dog barking sound, and barking sound waves of different dogs have different frequencies, so that the frequency of the barking sound wave may be quickly and accurately identified according to the type of the barking dog; the first driving sound wave with the same frequency is generated according to the frequency of the barking sound wave, and the first driving sound wave may be an ultrasonic wave or a processed dog barking sound, for example, if a current barking frequency of a Poodle dog is 16 KHz, a first driving sound wave of 16 KHz is generated; the first distance of the barking dog in the current environment is acquired, for example, if the current distance of the barking dog is 6 m, the first distance is 6 m; whether the first distance of the barking dog is less than the preset distance is judged, for example, if the preset distance is 7 m and the first distance is 6 m, the first distance is less than the preset distance; if the first distance of the barking dog is less than the preset distance, the first driving sound wave is emitted towards the barking dog, that is, the first driving sound wave of 16 KHz is emitted to drive the barking dog; the current second environmental sound is acquired, and the second environmental sound refers to all surrounding sounds within a period of time after the first driving sound wave is emitted; whether the dog barking sound exists in the current second environmental sound is judged, that is, after acquiring the environmental sound, whether the dog barking sound exists is judged; and if no dog barking sound exists in the current second environmental sound, the emission of the first driving sound wave is stopped, which indicates that the dog has stopped barking, so that the bark is successfully stopped.

In the whole bark stopping process, after acquiring the first environmental sound and identifying the dog barking sound, the type of the barking dog is identified, then the frequency of the barking sound wave is identified, and then the first driving sound wave with the same frequency is generated, and after acquiring the first distance, if the first distance is less than the preset distance, the first driving sound wave is emitted towards the barking dog to acquire the current second environmental sound, and if no barking sound exists in the second environmental sound, the emission of the first driving sound wave is stopped, and the bark is successfully stopped at this time.

In conclusion, the barking stopping method and the barking stopping device can stop the bark of the barking dog, thus facilitating long-term use by a user without having a negative impact on the olfactory sensation of the dog.

In this embodiment, the step of judging whether the dog barking sound exists in the environment, further comprises:

S191: if the dog barking sound exists in the environment, acquiring a second distance of the barking dog in the current environment;

S192: judging whether the second distance of the barking dog is less than a preset distance;

S193: if the second distance of the barking dog is less than the preset distance, sequentially carrying out numerical value transformation and pause in a preset frequency range on the basis of the frequency of the barking sound wave to obtain a plurality of second driving sound waves with different frequencies;

S194: sequentially emitting the second driving sound waves with different frequencies towards the barking dog at a preset time interval, acquiring a current third environmental sound once when the second driving sound wave is emitted every time until no dog barking sound exists in the third environmental sound, and stopping the emission of the second driving sound wave; and S195: recording a frequency of the last second driving sound wave without the dog barking sound, and packaging and storing the second driving sound wave at the frequency with a corresponding dog type.

In this embodiment, if the barking dog is still barking after the first driving sound wave is emitted, that is, the dog barking sound exists in the current second environmental sound, the second distance of the barking dog in the current environment is acquired in the same way as the first distance; whether the second distance of the barking dog is less than the preset distance is judged, for example, if the current distance of the barking dog is 6.5 m, the second distance is 6.5 m, and if the preset distance is 7 m, the second distance is less than the preset distance; if the second distance of the barking dog is less than the preset distance, the numerical value transformation and pause are sequentially carried out in the preset frequency range on the basis of the frequency of the barking sound wave to obtain the plurality of second driving sound waves with different frequencies, for example, if the barking sound wave frequency is 16 KHz and the preset frequency range is 15~30 KHz, the numerical value transformation and pause are sequentially carried out in a range of 16~30 KHz to obtain second driving sound waves of 16.5 KHz, 17 KHz, 17.5 KHz and the like up to 30 kHz; the second driving sound waves with different frequencies are sequentially emitted towards the barking dog at the preset time interval, the current third environmental sound is acquired once when the second driving sound wave is emitted every time until no dog barking sound exists in the third environmental sound, and the emission of the second driving sound wave is stopped, for example, after the second driving sound wave of 16.5 KHz is emitted, the current third environmental sound is acquired, if the dog barking sound exists, after the second driving sound wave of 17 KHz is emitted, the current third environmental sound is acquired, and if the dog barking sound still exists, after the second driving sound wave of 17.5 KHz is emitted, the current third environmental sound is acquired, and if no dog barking sound exists at this time, the emission of the second driving sound wave is stopped; and the frequency of the last second driving sound wave without the dog barking sound is recorded, and the second driving sound wave at the frequency is packaged and stored with the corresponding dog type, for example, if the Poodle dog is barking, after the second driving sound wave of 17.5 KHz is emitted, the dog barking sound is stopped, the second driving sound wave of 17.5 KHz is recorded, and packaged and stored with the type of the Poodle dog, and when the Poodle dog barks the next time, the second driving sound wave of 17.5 KHz is directly emitted.

In this embodiment, the step of sequentially carrying out the numerical value transformation and pause in the preset frequency range on the basis of the frequency of the barking sound wave to obtain the plurality of second driving sound waves with different frequencies, comprises:

S1931: acquiring a first sound wave frequency value of a current dog barking sound;

S1932: putting the first sound wave frequency value into a sound wave frequency threshold with a range of 15~30 kHz for comparison;

S1933: selecting a sound wave frequency waveband greater than the first sound wave frequency value and less than 30 KHz; and S1934: taking the first sound wave frequency value as a base quantity a, taking a preset increase frequency value as an increase quantity b, carrying out transformation and pause with $a+b''$, and assigning a value of $a+b''$ to the second driving sound wave to obtain a plurality of second driving sound waves which are gradually increased, wherein $n>0$, and a, b and n are all positive integers.

In this embodiment, the first sound wave frequency value of the current dog barking sound is acquired, and the frequency of the barking sound wave is identified according to the type of the barking dog and the dog barking sound, and the first sound wave frequency value is acquired, for example, the acquired first sound wave frequency value is 18 KHz; the first sound wave frequency value is put into the sound wave frequency threshold with the range of 15~30 KHz for comparison, for example, if the first sound wave frequency value is 18 KHz, the 18 KHz is put into the sound wave frequency threshold with the range of 15~30 KHz for comparison; the sound wave frequency waveband greater than the first sound wave frequency value and less than 30 KHz is selected, for example, the sound wave frequency threshold of 18~30 KHz is selected; and the first sound wave frequency value is taken as the base quantity a, the preset increase frequency value is taken as the increase quantity b, transformation and pause are carried out with $a+b''$, and the value of $a+b''$ is assigned to the second driving sound wave to obtain the plurality of second driving sound waves which are gradually increased, wherein $n>0$, and a, b and n are all positive integers, for example, if a is 18 KHz and b is 0.5 KHz, the second driving sound wave emitted for the first time is 18.5 KHz, the second driving sound wave emitted for the second time is 19 KHz, and the third driving sound wave emitted for the third time is 19.5 KHz.

In this embodiment, the step of sequentially emitting the second driving sound waves with different frequencies towards the barking dog at the preset time interval, and acquiring the current third environmental sound once when the second driving sound wave is emitted every time until no dog barking sound exists in the third environmental sound, comprises:

S1941: emitting the second driving sound wave within a first preset time;

S1942: acquiring the second environmental sound after waiting for a second preset time;

S1943: judging whether the dog barking sound exists in the third environmental sound; and S1944: if the dog barking sound exists in the third environmental sound, emitting the second driving sound waves with different frequencies within the first preset time;

S1945: acquiring the third environmental sound after waiting for the second preset time;

S1946: judging whether the dog barking sound exists in the third environmental sound; and S1947: if the dog barking sound exists in the third environmental sound, repeatedly executing the above steps until no dog barking sound exists in the third environmental sound.

In this embodiment, the second driving sound wave is emitted within the first preset time, for example, the second driving sound wave is emitted within 3 seconds, that is, the second driving sound wave is continuously transmitted for 3 seconds; the second environmental sound is acquired after waiting for the second preset time, for example, the second environmental sound is acquired after waiting for 2 seconds; whether the dog barking sound exists in the third environmental sound is judged; if the dog barking sound exists in the third environmental sound, the second driving sound waves with different frequencies are emitted within the first preset time, for example, if the second driving sound wave of 18 KHz is emitted last time, the second driving sound wave of 18.5 KHz is emitted this time; the third environmental sound is acquired after waiting for the second preset time, for example, the third environmental sound is acquired after waiting for 2 seconds; and whether the dog barking sound exists in the third environmental sound is judged; if the dog barking sound exists in the third environmental sound, the above steps are repeatedly executed until no dog barking sound exists in the third environmental sound, for example, if the dog barking sound still exists after the second driving sound wave of 18.5 KHz is emitted last time, the second driving sound wave of 19 KHz is emitted, and if the dog barking sound still exists in the acquired third environmental sound, the second driving sound wave of 19.5 KHz is emitted until no dog barking sound exists in the third environmental sound, wherein an upper limit of the second driving sound wave is 30 KHz.

In this embodiment, the step of acquiring the first distance of the barking dog in the current environment, comprises:

S151: acquiring a horizontal distance, a vertical height and a transverse width of a front object;

S152: judging whether the horizontal distance is less than a preset distance;

S153: if the horizontal distance is less than the preset distance, carrying out first marking;

S154: judging whether the vertical height is within a preset dog standing height threshold;

S155: if the vertical height is within the preset dog standing height threshold, carrying out second marking;

S156: judging whether the transverse width is within a preset dog standing width threshold;

S157: if the transverse width is within the preset dog standing width threshold, carrying out third marking; and S158: if the front object satisfies the first marking, the second marking and the third marking at the same time, identifying the front object as the barking dog by default, and assigning the horizontal distance as the first distance.

In this embodiment, the horizontal distance, the vertical height and the transverse width of the front object are acquired; whether the horizontal distance is less than the preset distance is judged, for example, the present distance is 7 m; if the horizontal distance is less than the preset distance, first marking is carried out, for example, if the horizontal distance of the front object is 6 m and the preset distance is 7 m, the first marking is carried out on the front object; whether the vertical height is within the preset dog standing height threshold is judged, for example, the preset dog standing height threshold is 20~120 mm; if the vertical height is within the preset dog standing height threshold, second marking is carried out, for example, if the vertical height of the front object is 50 mm, the vertical height falls within 20~120 mm, and the second marking is carried out on the front object; whether the transverse width is within the preset dog standing width threshold is judged, for example, the preset dog standing width threshold is 15~150 mm, and this width covers front and side widths a dog, and is a broad value; if the transverse width is within the preset dog standing width threshold, third marking is carried out, for example, if the transverse width of the front object is 40 mm, the transverse width falls within 15~150 mm, and the third marking is carried out on the front object; and if the front object satisfies the first marking, the second marking and the third marking at the same time, the front object is identified as the barking dog by default, and the horizontal distance is assigned as the first distance.

Figure 3:
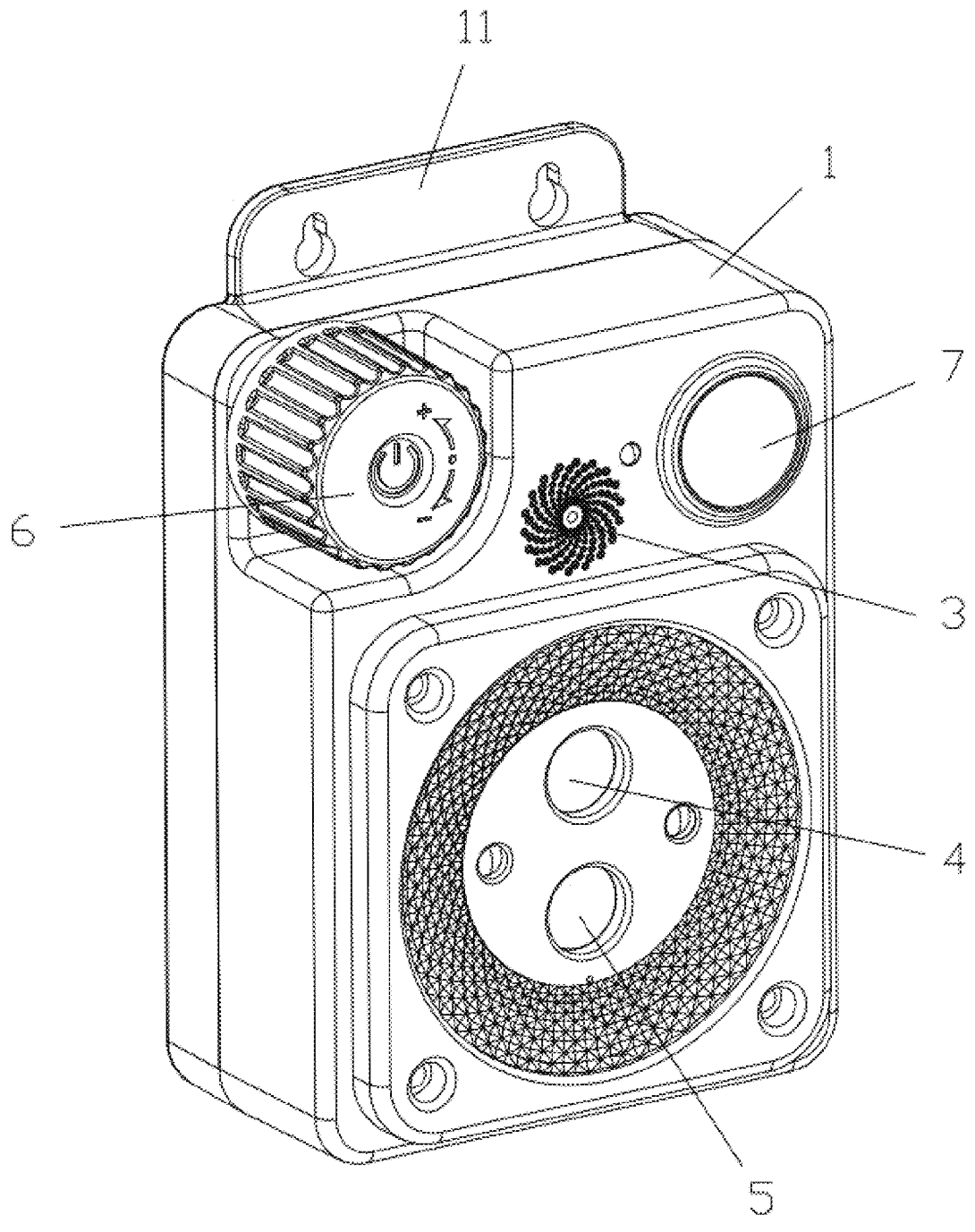
FIG. 3 is an overall diagram of the bark stopping device of the present invention.

With reference to FIG. 1 and FIG. 3, a bark stopping device, according to the bark stopping method above, comprises a shell 1, a circuit board, a sound collecting module 3, a distance detecting module 4 and a sound wave emitting module 5, wherein the circuit board is fixedly connected in the shell 1, one end of the shell 1 is provided with a hanging plate 11 for external fixation, the bark stopping device may be fixed on a wall or other vertical planes through the hanging plate 11, the sound collecting module 3, the distance detecting module 4 and the sound wave emitting module 5 are all fixedly connected to one side of the shell 1, the sound collecting module 3, the distance detecting module 4 and the sound wave emitting module 5 are all oriented to the outside, the sound collecting module 3, the distance detecting module 4 and the sound wave emitting module 5 are all electrically connected with the circuit board, and the circuit board is provided with a first comparing and identifying module 21, a second comparing and identifying module 22, a third comparing and identifying module 23, an computing module 24, a first judging module 25, a first executing module 26, a second judging module 27 and a second executing module 28.

The sound collecting module 3 is configured for acquiring the current first environmental sound, second environmental sound and third environmental sound.

The distance detecting module 4 is configured for acquiring the first distance and the second distance of the barking dog in the current environment.

The sound wave emitting module 5 is configured for emitting the first driving sound wave and the second driving sound wave towards the barking dog.

The first comparing and identifying module 21 is configured for identifying the dog barking sound according to the first environmental sound.

The second comparing and identifying module 22 is configured for identifying the type of the barking dog according to the dog barking sound in combination with the pre-stored sound model.

The third comparing and identifying module 23 is configured for identifying the frequency of the barking sound wave according to the type of the barking dog and the dog barking sound.

The computing module 24 is configured for generating the first driving sound wave with the same frequency according to the frequency of the barking sound wave.

The first judging module 25 is configured for judging whether the first distance of the barking dog is less than the preset distance.

The first executing module 26 is configured for, if the first distance of the barking dog is less than the preset distance, issuing an instruction to the sound wave emitting module 5, and emitting, by the sound wave emitting module 5, the first driving sound wave towards the barking dog.

The second judging module 27 is configured for judging whether the dog barking sound exists in the current second environmental sound.

The second executing module 28 is configured for, if no dog barking sound exists in the current second environmental sound, stopping the emission of the first driving sound wave.

In this embodiment, when the first environmental sound, the second environmental sound and the third environmental sound are acquired, the sound collecting module 3 is used for acquisition, the sound collecting module 3 is a microphone, the distance detecting module 4 may be an ultrasonic distance detecting module or an infrared distance detecting module, and the sound wave emitting module 5 may be an ultrasonic wave emitting module or a loudspeaker.

In this embodiment, the circuit board is further provided with a third executing module, a third judging module, a fourth executing module, an alternative executing module and a record storage module.

The third executing module is configured for, if the dog barking sound exists in the current second environmental sound, starting up the sound collecting module.

The third judging module configured for judging whether the second distance of the barking dog is less than the preset distance.

The fourth executing module is configured for, if the second distance of the barking dog is less than the preset distance, sequentially carrying out the numerical value transformation and pause in the preset frequency range on the basis of the frequency of the barking sound wave to obtain the plurality of second driving sound waves with different frequencies.

The alternative executing module is configured for sequentially emitting the second driving sound waves with different frequencies towards the barking dog at the preset time interval, acquiring the current third environmental sound once when the second driving sound wave is emitted every time until no dog barking sound exists in the third environmental sound, and stopping the emission of the second driving sound wave.

The record storage module is configured for recording the frequency of the last second driving sound wave without the dog barking sound, and packaging and storing the second driving sound wave at the frequency with the corresponding dog type.

In this embodiment, the bark stopping device further comprises a distance detection and adjustment switch 6, the distance detection and adjustment switch 6 is fixedly connected to the shell 1, and the distance detection and adjustment switch 6 is electrically connected with the circuit board. The distance detection and adjustment switch 6 is used for adjusting a detection distance of the distance detecting module 4, for example, if the barking stopping device is mounted in a relatively empty place in surrounding environment, the original preset distance may be adjusted from 7 m to 10 m, that is, when the dog barks within 7 m, the bark stopping device will emit the driving sound wave, and after adjustment, when the dog barks within 10 m, the bark stopping device will emit the driving sound wave. The distance detection and adjustment switch 6 may be a knob switch or a linear adjustment switch.

In this embodiment, the bark stopping device further comprises a display screen 7, the display screen 7 is fixedly connected to one side of the shell 1, and the display screen 7 is electrically connected with the circuit board. The display screen 7 may display a distance of a current barking dog, and may also display a current time.

In this embodiment, the bark stopping device further comprises a battery, the battery is fixedly connected inside the shell 1, and the battery is electrically connected with the circuit board. The battery is a lithium battery used to supply power to the bark stopping device, which is convenient for carrying the bark stopping device to the outside.

Certainly, there are many other embodiments in the present invention, and based on the embodiment, other embodiments obtained by those of ordinary skills in the art without going through any creative work are all within the scope of protection of the present invention.

The invention claimed is:

1. A bark stopping method, comprising:

acquiring a current first environmental sound;

identifying a dog barking sound according to the first environmental sound;

identifying a type of a barking dog according to the dog barking sound in combination with a pre-stored sound model;

identifying a frequency of a barking sound wave according to the type of the barking dog and the dog barking sound;

generating a first driving sound wave with the same frequency according to the frequency of the barking sound wave;

acquiring a first distance of the barking dog in a current environment;

judging whether the first distance of the barking dog is less than a preset distance;

if the first distance of the barking dog is less than the preset distance, emitting the first driving sound wave towards the barking dog;

acquiring a current second environmental sound;

judging whether the dog barking sound exists in the current second environmental sound; and if no dog barking sound exists in the current second environmental sound, stopping the emission of the first driving sound wave.

2. The bark stopping method according to claim 1, wherein the step of judging whether the dog barking sound exists in the environment, further comprises:

if the dog barking sound exists in the environment, acquiring a second distance of the barking dog in the current environment;

judging whether the second distance of the barking dog is less than a preset distance;

if the second distance of the barking dog is less than the preset distance, sequentially carrying out numerical value transformation and pause in a preset frequency range on the basis of the frequency of the barking sound wave to obtain a plurality of second driving sound waves with different frequencies;

sequentially emitting the second driving sound waves with different frequencies towards the barking dog at a preset time interval, acquiring a current third environmental sound once when the second driving sound wave is emitted every time until no dog barking sound exists in the third environmental sound, and stopping the emission of the second driving sound wave; and recording a frequency of the last second driving sound wave without the dog barking sound, and packaging and storing the second driving sound wave at the frequency with a corresponding dog type.

3. The bark stopping method according to claim 2, wherein the step of sequentially carrying out the numerical value transformation and pause in the preset frequency range on the basis of the frequency of the barking sound wave to obtain the plurality of second driving sound waves with different frequencies, comprises:

acquiring a first sound wave frequency value of a current dog barking sound;

putting the first sound wave frequency value into a sound wave frequency threshold with a range of 15~30 KHz for comparison;

selecting a sound wave frequency waveband greater than the first sound wave frequency value and less than 30 KHz; and taking the first sound wave frequency value as a base quantity a, taking a preset increase frequency value as an increase quantity b, carrying out transformation and pause with $a+b''$, and assigning a value of $a+b''$ to the second driving sound wave to obtain a plurality of second driving sound waves which are gradually increased, wherein n>0, and a, b and n are all positive integers.

4. The bark stopping method according to claim 2, wherein the step of sequentially emitting the second driving sound waves with different frequencies towards the barking dog at the preset time interval, and acquiring the current third environmental sound once when the second driving sound wave is emitted every time until no dog barking sound exists in the third environmental sound, comprises:

emitting the second driving sound wave within a first preset time;

acquiring the second environmental sound after waiting for a second preset time;

judging whether the dog barking sound exists in the third environmental sound;

if the dog barking sound exists in the third environmental sound, emitting the second driving sound waves with different frequencies within the first preset time;

acquiring the third environmental sound after waiting for the second preset time;

judging whether the dog barking sound exists in the third environmental sound; and if the dog barking sound exists in the third environmental sound, repeatedly executing the above steps until no dog barking sound exists in the third environmental sound.

5. The bark stopping method according to claim 1, wherein the step of acquiring the first distance of the barking dog in the current environment, comprises:

acquiring a horizontal distance, a vertical height and a transverse width of a front object;

judging whether the horizontal distance is less than a preset distance;

if the horizontal distance is less than the preset distance, carrying out first marking;

judging whether the vertical height is within a preset dog standing height threshold;

if the vertical height is within the preset dog standing height threshold, carrying out second marking;

judging whether the transverse width is within a preset dog standing width threshold;

if the transverse width is within the preset dog standing width threshold, carrying out third marking; and if the front object satisfies the first marking, the second marking and the third marking at the same time, identifying the front object as the barking dog by default, and assigning the horizontal distance as the first distance.

6. A bark stopping device, comprising a shell, a circuit board, a sound collecting module, a distance detecting module and a sound wave emitting module, wherein the circuit board is fixedly connected in the shell, the sound collecting module, the distance detecting module and the sound wave emitting module are all fixedly connected to one side of the shell, the sound collecting module, the distance detecting module and the sound wave emitting module are all oriented to the outside, the sound collecting module, the distance detecting module and the sound wave emitting module are all electrically connected with the circuit board, and the circuit board is provided with a first comparing and identifying module, a second comparing and identifying module, a third comparing and identifying module, an computing module, a first judging module, a first executing module, a second judging module and a second executing module;

the sound collecting module is configured for acquiring the current first environmental sound, second environmental sound and third environmental sound;

the distance detecting module is configured for acquiring the first distance and the second distance of the barking dog in the current environment;

the sound wave emitting module is configured for emitting the first driving sound wave and the second driving sound wave towards the barking dog;

the first comparing and identifying module is configured for identifying the dog barking sound according to the first environmental sound;

the second comparing and identifying module is configured for identifying the type of the barking dog according to the dog barking sound in combination with the pre-stored sound model;

the third comparing and identifying module is configured for identifying the frequency of the barking sound wave according to the type of the barking dog and the dog barking sound;

the computing module is configured for generating the first driving sound wave with the same frequency according to the frequency of the barking sound wave;

the first judging module is configured for judging whether the first distance of the barking dog is less than the preset distance;

the first executing module is configured for, if the first distance of the barking dog is less than the preset distance, emitting the first driving sound wave towards the barking dog;

the second judging module is configured for judging whether the dog barking sound exists in the current second environmental sound; and the second executing module is configured for, if no dog barking sound exists in the current second environmental sound, stopping the emission of the first driving sound wave.

7. The bark stopping device according to claim 6, wherein the circuit board is further provided with a third executing module, a third judging module, a fourth executing module, an alternative executing module and a record storage module;

the third executing module is configured for, if the dog barking sound exists in the current second environmental sound in judgement, starting up the sound collecting module;

the third judging module is configured for judging whether the second distance of the barking dog is less than the preset distance;

the fourth executing module is configured for, if the second distance of the barking dog is less than the preset distance, sequentially carrying out the numerical value transformation and pause in the preset frequency range on the basis of the frequency of the barking sound wave to obtain the plurality of second driving sound waves with different frequencies;

the alternative executing module is configured for sequentially emitting the second driving sound waves with different frequencies towards the barking dog at the preset time interval, acquiring the current third environmental sound once when the second driving sound wave is emitted every time until no dog barking sound exists in the third environmental sound, and stopping the emission of the second driving sound wave; and

the record storage module is configured for recording the frequency of the last second driving sound wave without the dog barking sound, and packaging and storing the second driving sound wave at the frequency with the corresponding dog type.

8. The bark stopping device according to claim 6, wherein the bark stopping device further comprises a distance detection and adjustment switch, the distance detection and adjustment switch is fixedly connected to the shell, and the distance detection and adjustment switch is electrically connected with the circuit board.

9. The bark stopping device according to claim 6, wherein the bark stopping device further comprises a display screen, the display screen is fixedly connected to one side of the shell, and the display screen is electrically connected with the circuit board.

10. The bark stopping device according to claim 6, wherein the bark stopping device further comprises a battery, the battery is fixedly connected inside the shell, and the battery is electrically connected with the circuit board.

* * * * *